(12) United States Patent
Tarocco et al.

(10) Patent No.: US 12,479,668 B2
(45) Date of Patent: Nov. 25, 2025

(54) SUPPORT PLATE FOR A CARROUSEL MACHINE AND CARROUSEL MACHINE COMPRISING IT

(71) Applicant: KOSME S.R.L. UNIPERSONALE, Roverbella (IT)

(72) Inventors: Emanuele Tarocco, Roverbella (IT); Giovanni Saccardi, Roverbella (IT)

(73) Assignee: KOSME S.R.L. UNIPERSONALE, Roverbella (IT)

( * ) Notice: Subject to any disclaimer, the term of this patent is extended or adjusted under 35 U.S.C. 154(b) by 87 days.

(21) Appl. No.: 18/663,625

(22) Filed: May 14, 2024

(65) Prior Publication Data
US 2024/0383692 A1 Nov. 21, 2024

(30) Foreign Application Priority Data
May 15, 2023 (IT) .................. 102023000009756

(51) Int. Cl.
*B65G 29/00* (2006.01)
*B65G 47/80* (2006.01)
(Continued)

(52) U.S. Cl.
CPC .......... *B65G 29/00* (2013.01); *B65G 47/846* (2013.01); *B67C 3/24* (2013.01); *B65G 47/80* (2013.01);
(Continued)

(58) Field of Classification Search
CPC ...... B65G 47/80; B65G 47/846; B65G 29/00; B65G 2201/0244; B65G 2812/14; B67C 3/24

See application file for complete search history.

(56) References Cited

U.S. PATENT DOCUMENTS 2,707,547 A * 5/1955 Gewecke ................ B65C 9/065
156/DIG. 27
3,630,242 A * 12/1971 Schieser ................... B67C 7/00
141/159
(Continued)

FOREIGN PATENT DOCUMENTS

CN 112062074 12/2020
CN 116835505 A * 10/2023 ............... B67B 3/10
(Continued)

OTHER PUBLICATIONS

Italian Search Report, issued on Nov. 2, 2023 in IT 202300009756, 7 pages.

*Primary Examiner* — James R Bidwell
(74) *Attorney, Agent, or Firm* — Chrisman Gallo Tochtrop LLC

(57) ABSTRACT

A support plate for a carrousel machine comprising a seat for housing a lower portion of a bottle, an elastically deformable locking body at the lateral wall of the seat, and a deforming unit movable between an inactive position in which it allows the locking body to adopt a home configuration, and an active position, in which it mechanically acts on the at least one locking body and keeps it in a deformed configuration in which it projects towards the inside of the seat to adhere to a lateral surface of the bottle. The insertion of a bottle into the seat causes the passage of the deforming unit from the inactive position to the active position and of the locking body to the deformed configuration.

20 Claims, 8 Drawing Sheets

(51) Int. Cl.
*B65G 47/84* (2006.01)
*B67C 3/24* (2006.01)
(52) U.S. Cl.
CPC .. *B65G 2201/0244* (2013.01); *B65G 2812/14* (2013.01)

(56) References Cited

U.S. PATENT DOCUMENTS

| | | | | |
|---|---|---|---|---|
| 4,647,051 A | * | 3/1987 | Stone | B23B 31/1207 |
| | | | | 279/119 |
| 7,303,195 B2 | * | 12/2007 | Nie | B23Q 1/0072 |
| | | | | 269/309 |
| 2022/0081275 A1 | * | 3/2022 | Godet | B65D 79/0081 |

FOREIGN PATENT DOCUMENTS

| | | | | |
|---|---|---|---|---|
| DE | 202014105768 U1 | * | 3/2016 | ............. B65C 9/045 |
| EP | 0209064 A1 | * | 1/1987 | ............... B67C 3/24 |
| EP | 3025974 | | 10/2018 | |

* cited by examiner

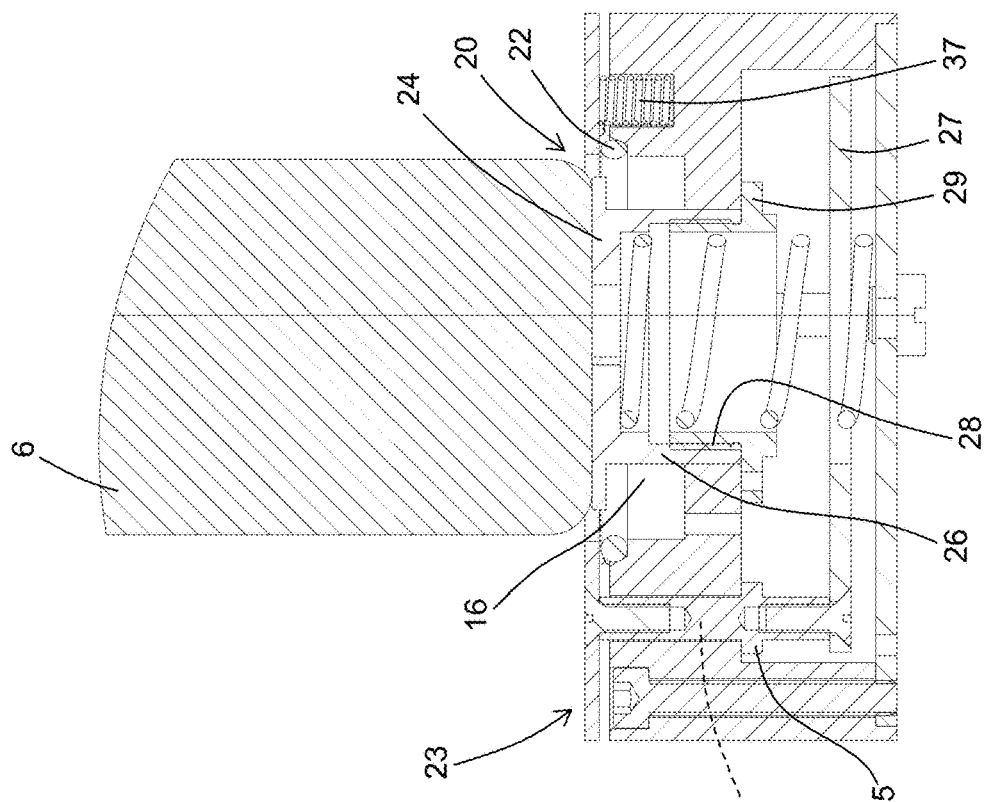
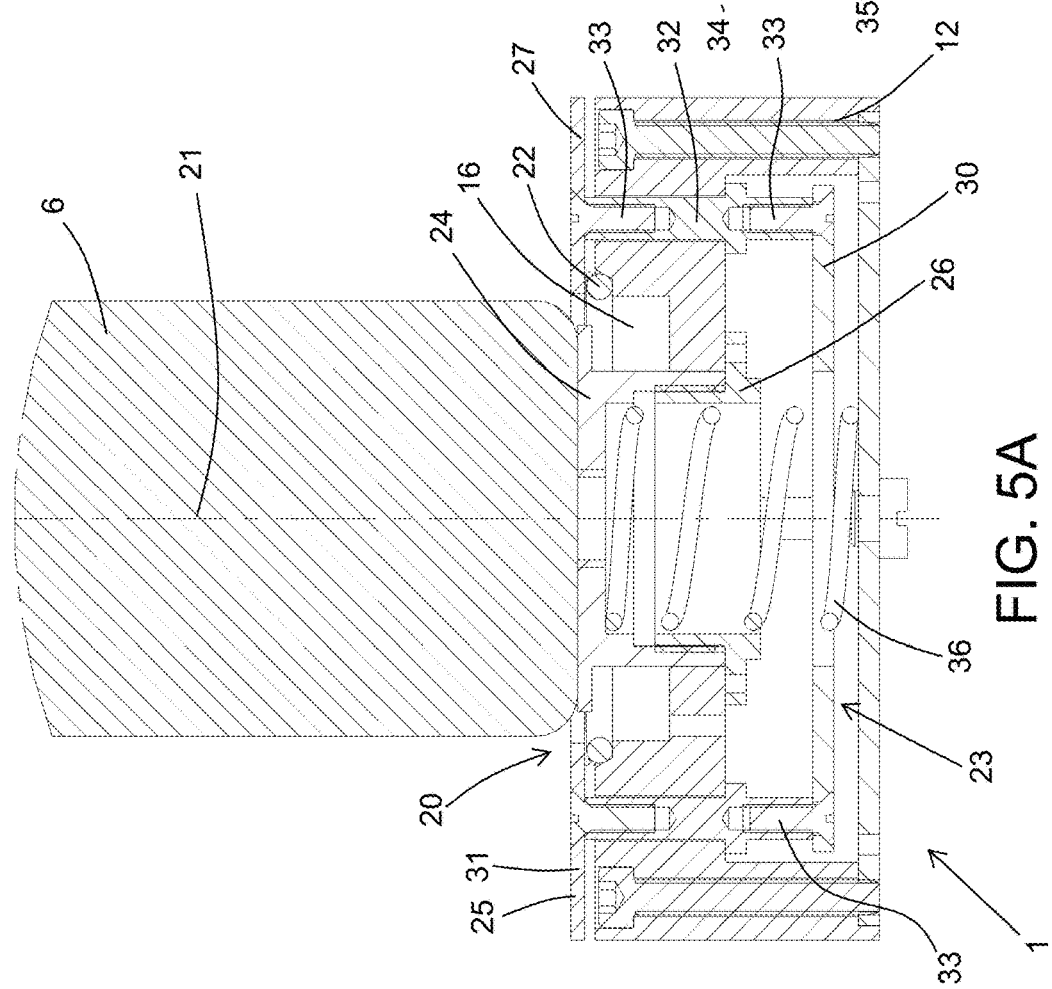

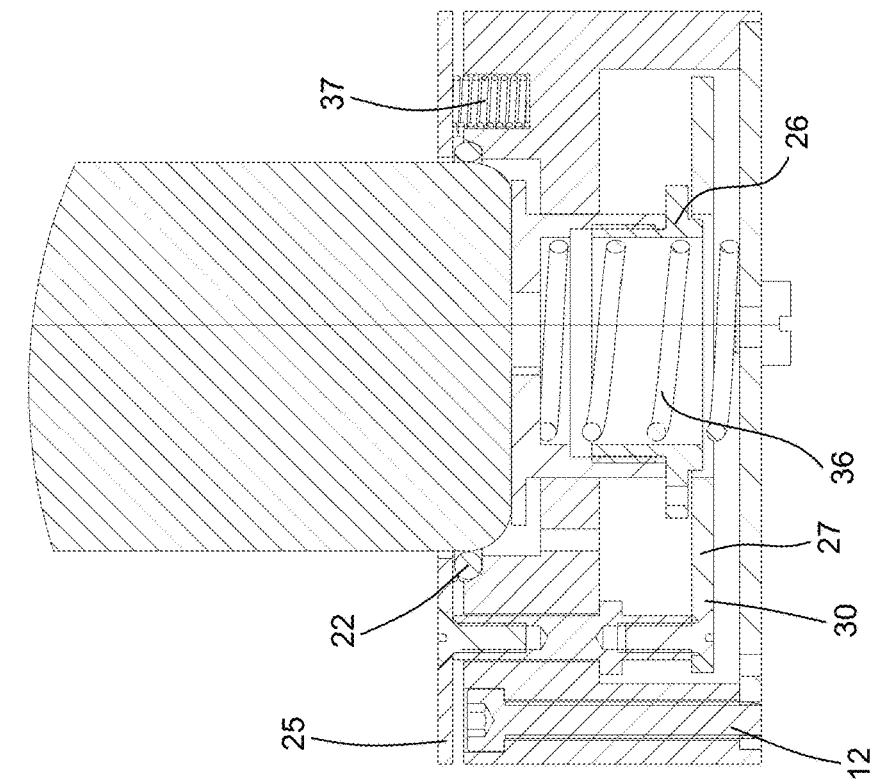
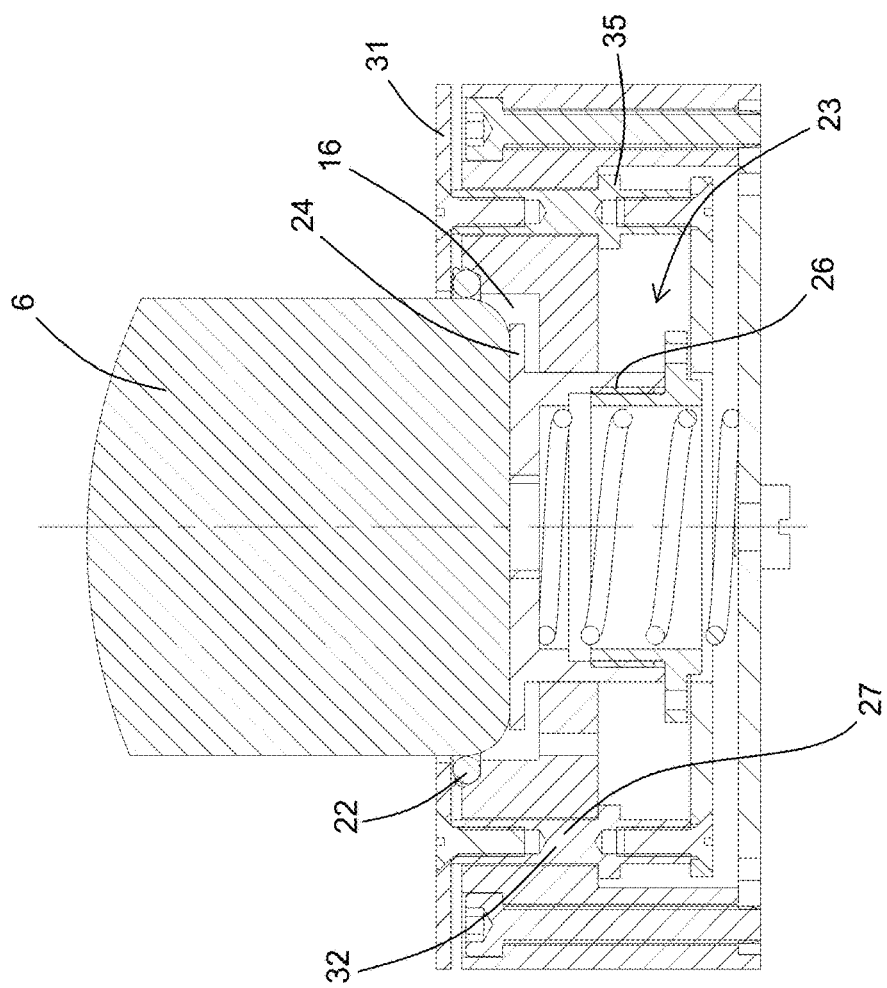
FIG. 6A
FIG. 6B

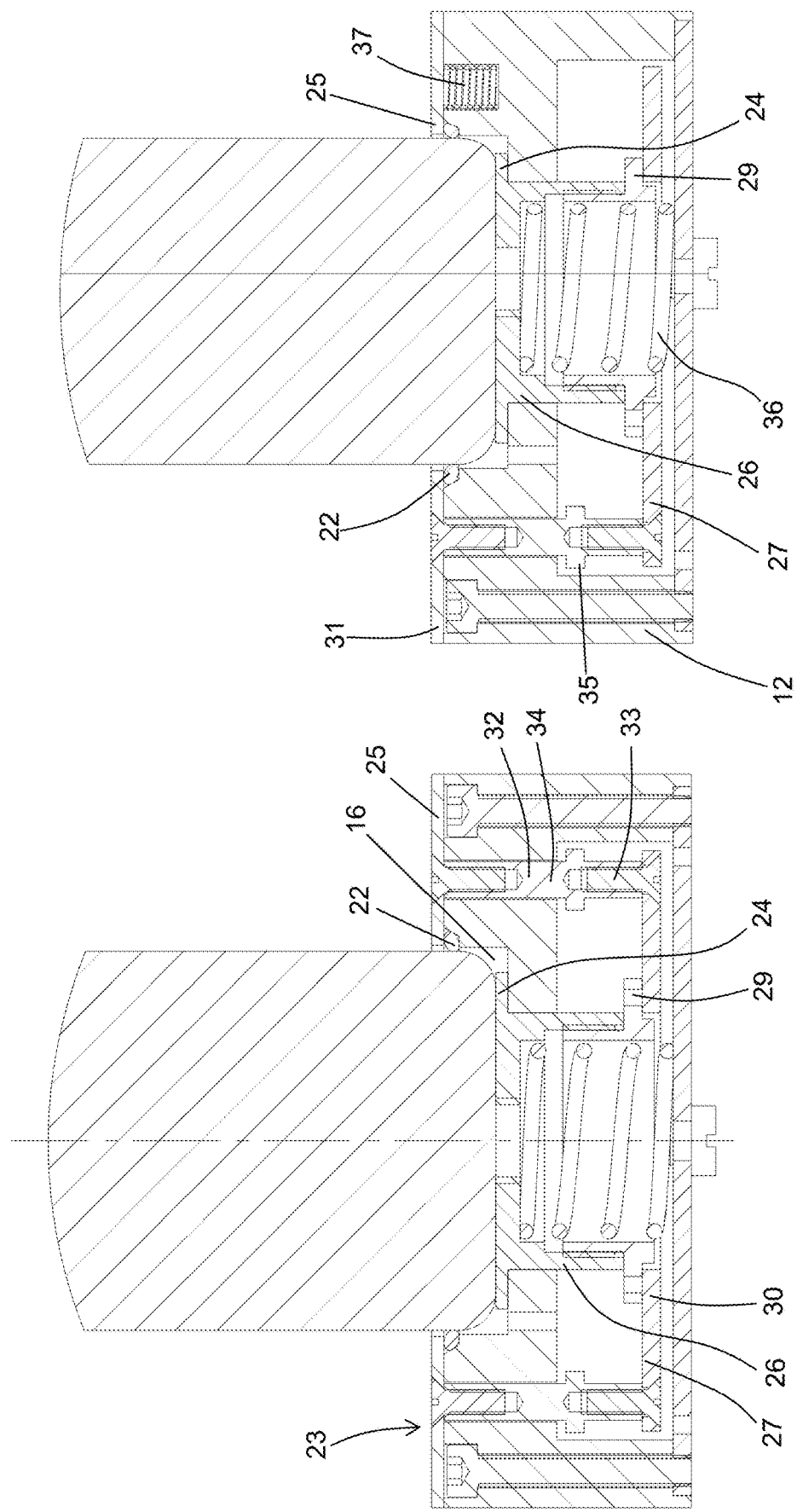

SUPPORT PLATE FOR A CARROUSEL MACHINE AND CARROUSEL MACHINE COMPRISING IT

CROSS-REFERENCE TO RELATED APPLICATIONS

This application claims priority from Italian Patent Application No. 102023000009756 filed on May 15, 2023. The content of this application is incorporated herein by reference in its entirety.

The present invention relates to a support plate for a carrousel machine and a carrousel machine comprising it.

As is known, carrousel machines are a type of apparatus widely used in plants in which processing operations are performed on bottles, such as filling, capping, labelling, etc.

Carrousel machines comprise a rotating carrousel which on its perimeter carries a plurality of operating stations.

Each operating station is configured to receive a bottle when it is situated in an initial angular position in which a loading station is situated, and to transport it until an end angular position in which an unloading station is situated.

Several production units may be positioned along the path followed by the operating station as it rotates about the carrousel's central axis.

In general, each operating station comprises a support plate in the lower part and a retaining system in the upper part. The support plate (also generically defined as a "plate" in the sector) acts as a support for the bottle, while the retaining system keeps it aligned with the support plate.

Depending on the applications, the support plate can be mounted on the carrousel in a fixed manner or rotatably so that it can rotate on itself about its own central vertical axis. In the latter case, the support plate can also be motorised or idle. Being able to rotate the bottle about the central axis is essential for some types of processing operations (such as labelling), whereas it is not necessary for other types (such as filling).

When the support plate is rotatable, the retaining means are also configured to allow the bottle to rotate.

In most applications involving bottle rotation, only one of the support plate and the rotating means are connected to means capable of rotating it as intended (e.g. a motor or cam system) and the other is instead idle. In the vast majority of cases, however, it is the retaining means that are idle.

A key aspect for many processing operations, including all such operations involving controlled bottle rotation, is that during the performance of the processing operation the bottle is made integral with the support plate on which it rests, so that its angular position can be precisely controlled.

To this end, many technical solutions have been proposed over the years to create a mechanical coupling between the support plate and the bottle. Some very simple solutions involve covering the top of the support plate with a non-slip material and having the retaining means press down on the bottle, squashing it on the non-slip material.

For a relatively low cost, these solutions have both the drawback of being subject to problems with wear and tear of the non-slip material and the drawback of being exposed to the risk of dirt settling on the non-slip material.

In both cases, the adherence of the bottle to the support plate can diminish over time until slippage may begin to occur that can jeopardise the proper performance of the intended processing operation.

Many other solutions, on the other hand, involve the support plate having one or more movable engaging teeth configured to engage corresponding recesses present in the bottom of the bottle.

This solution, although very reliable, also has some drawbacks.

First, implementing movable engaging teeth involves some complexity in design and construction, leading to higher costs.

Second, this solution results in relatively high wear of the tooth, given the need to slide the bottle relative to the support plate until the tooth is at the recess.

Third, this technical solution cannot be used whenever the bottle has a smooth bottom with no recesses.

In this context, the technical purpose of the present invention is to produce a support plate for a carrousel machine that offers a solution to the issues mentioned above.

In particular, the technical purposes of the present invention is to make a support plate for a carrousel machine which is mechanically simple, which can also be used with bottles without recesses in the bottom and which is less prone to issues of wear and dirt than presently known devices.

Another technical purpose of the present invention is to make a support plate for a carrousel machine as an alternative to presently known devices. The technical purpose and the aims indicated above are substantially achieved by a support plate for a carrousel machine and by a carrousel machine comprising it, in accordance with the contents of the independent claim 1 and claim 15 respectively. Particular embodiments of the present invention are defined in the dependent claims.

Further features and the advantages of the present invention will become more apparent upon careful reading of the detailed description of several preferred, non-limiting embodiments of a support plate for a carrousel machine and of a carrousel machine comprising it, as shown in the accompanying drawings, in which:

FIG. 5A shows, sectioned along the A-A plane, the support plate in FIG. 3 loaded with a bottle (of which only a lower part is visible) in an early operating step;

FIG. 5B shows the support plate in the configuration in FIG. 5A sectioned, however, along the B-B plane in FIG. 3;

FIG. 6A shows the support plate in FIG. 5A sectioned, in a second operating step;

FIG. 6B shows the support plate in the configuration in FIG. 6A sectioned, however, along the B-B plane in FIG. 3;

FIG. 8A shows the support plate in FIG. 5A sectioned, in a fourth operating step;

FIG. 8B shows the support plate in the configuration in FIG. 8A sectioned, however, along the B-B plane in FIG. 3;

Figure 1:
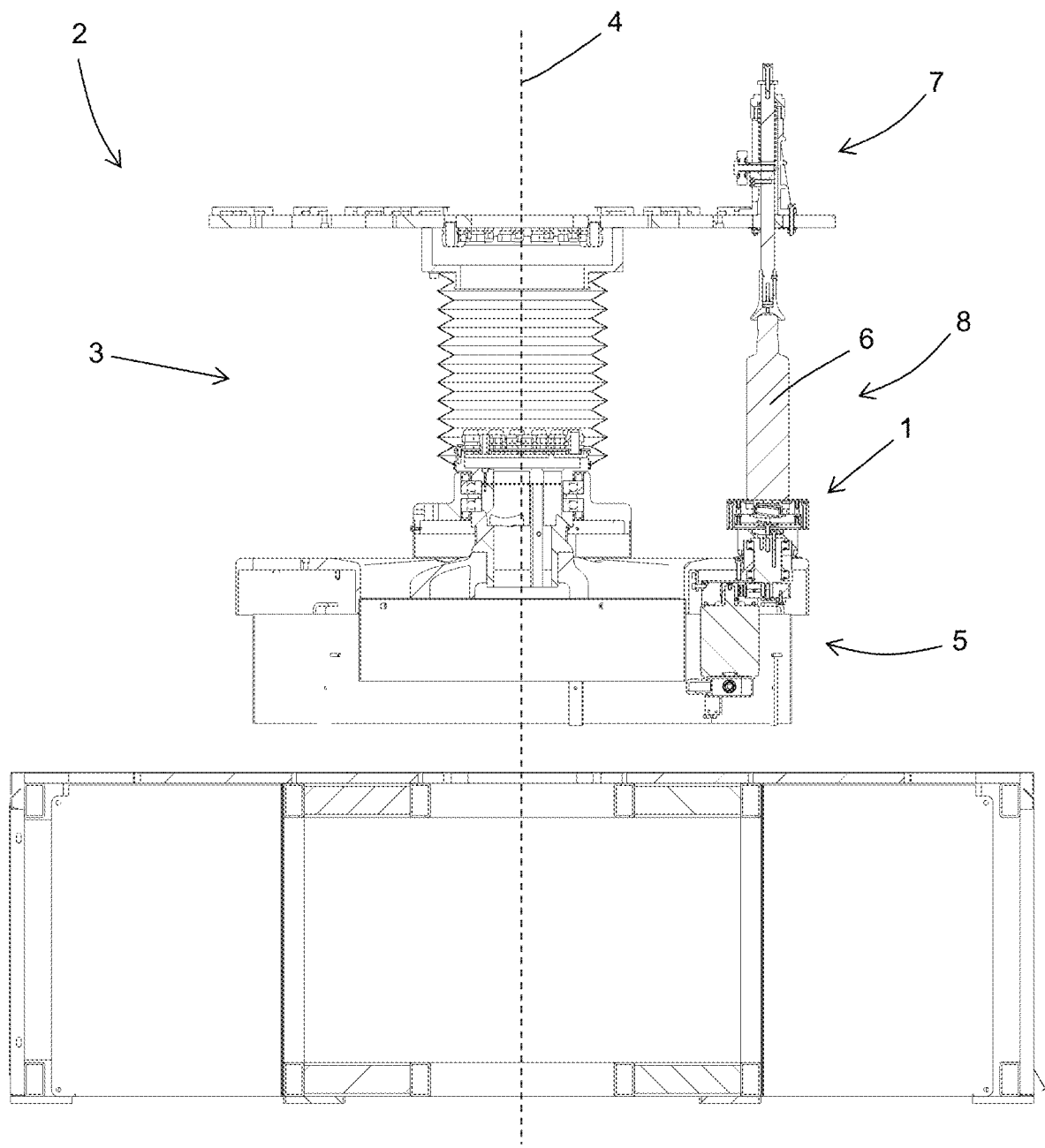
FIG. 1 shows a schematic vertical section view, with some parts removed to better highlight others, of a carrousel machine mounted by a support plate according to the present invention (in particular, the machine's other support plates have been omitted for clarity)
Figure 2:
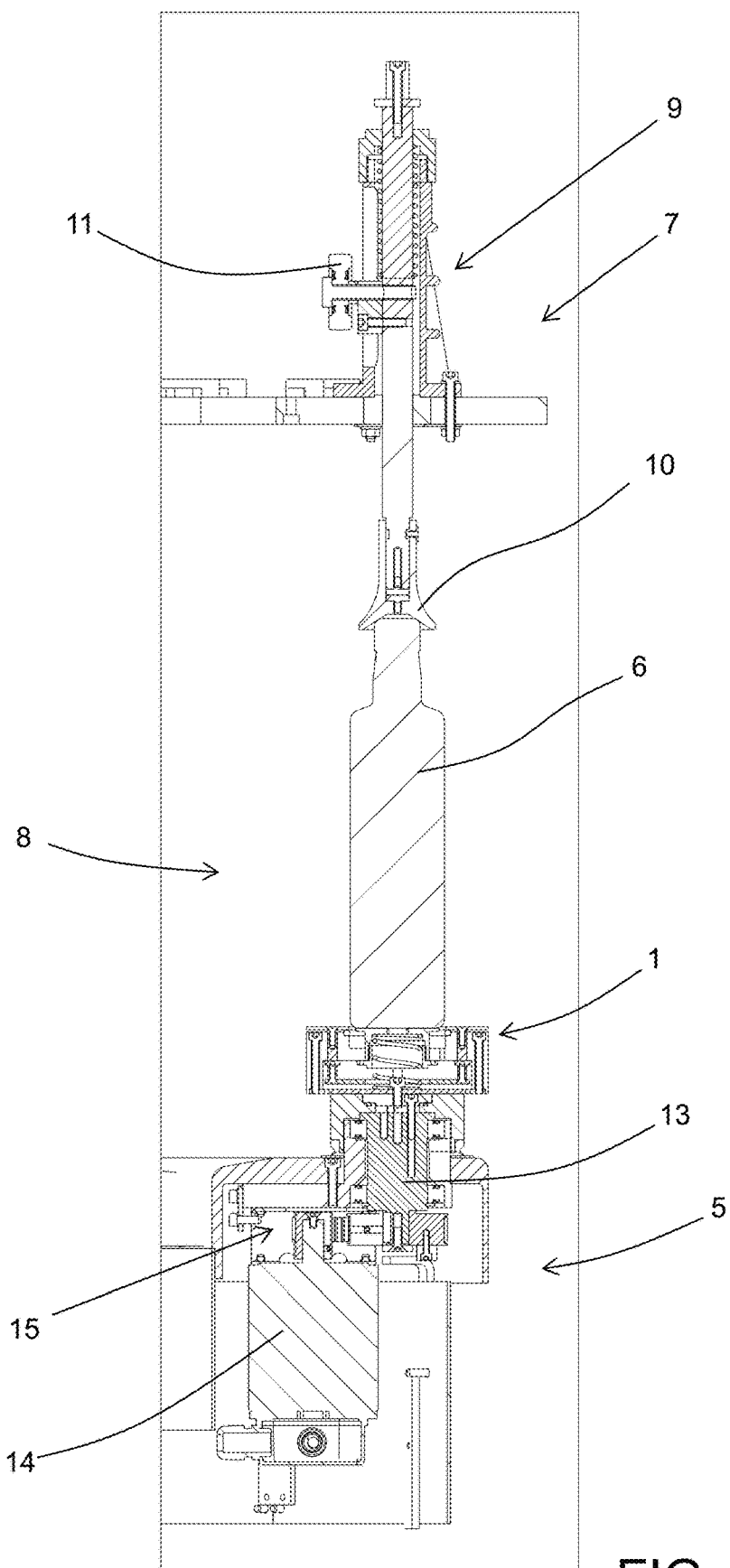
FIG. 2 shows a close-up of an operating station of the carrousel machine in FIG. 1.
Figure 3:
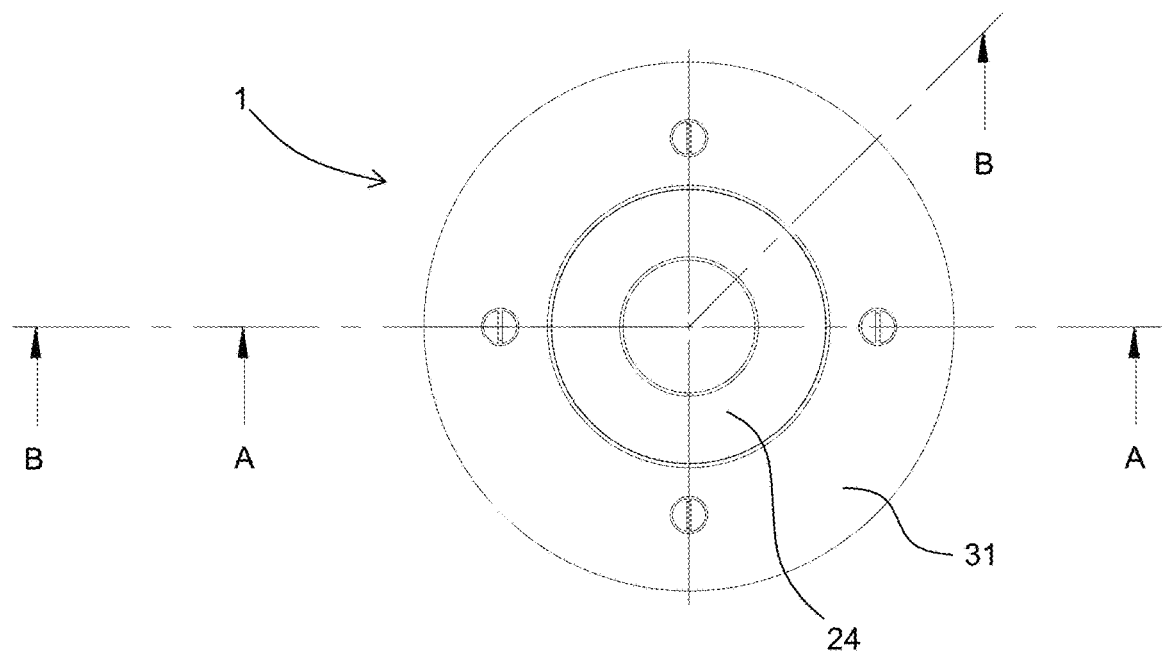
FIG. 3 shows a view from above of a support plate according to the present invention.
Figure 4:
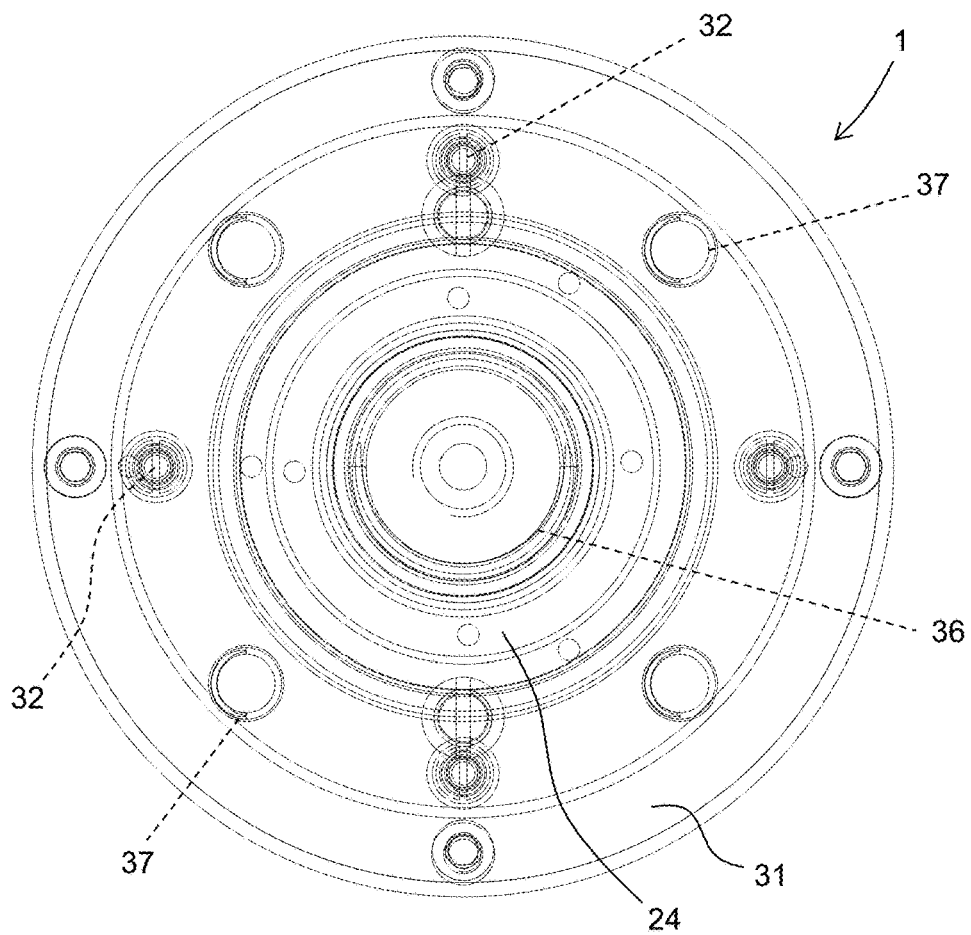
FIG. 4 shows a transparent plan view of the support plate in FIG. 3.

Referring to the drawings above, a complete support plate for a carrousel machine according to the present invention has been assigned reference number 1 (which in sector jargon can be defined as just "plate") and a machine on which the support plate 1 is installed has been assigned reference number 2.

The carrousel machine 2, in the known way, can be intended perform one or more processing operations on bottles, and comprises a rotating carrousel 3 that rotates about a main axis of rotation 4.

Advantageously, in the rotating carrousel 3, a lower part 5 intended to support bottles 6 and an upper part 7 can be identified.

A plurality of operating stations 8 are distributed about the main axis of rotation 4 and along perimeter zones of the rotating carrousel 3. Each operating station 8 comprises a support plate 1 mounted on the lower part 5 and a pusher 9 integral with the upper part 7 of the rotating carrousel 3. The pusher 9 is configured to press in use the bottle 6 against the support plate 1 according to the methods described below. For this purpose, the pusher 9 can comprise an upturned cup 10 configured to be put on the head of the bottle 6 as shown in the accompanying drawings.

In the known way, the support plate 1 is positioned with its central axis 21 parallel to the axis of rotation of the rotating carrousel 3. The pusher 9 is operatively active along the central axis 21 to press the bottle 6 against the support plate 1. In some embodiments, the pusher 9 is powered by a cam integral with a stationary part of the carrousel machine 2, which is engaged by a cam follower 11 integral with the pusher 9 itself.

Advantageously, the support plate 1 is configured to rotate about the central axis 21 together with the bottle 6, the upturned cup 10 of the pusher 9 is free to rotate about the central axis 21 itself.

According to the present invention, the support plate 1 comprises a containment body 12 which is mountable on the rotating carrousel 3 of the carrousel machine 2. Advantageously, the containment body 12 can be rotatably mounted on the rotating carrousel 3 to rotate about a vertical axis; for example, it can be rigidly constrained to a support body 13 rotatably mounted on the rotating carrousel 3. The rotation of the support body 13 can be controlled by a motor 14 of the operating station 8, connected to the support body 13 by a belt drive 15.

This does not detract from the fact that in some embodiments the containment body 12 can also be mounted fixedly relative to the rotating carrousel 3. The containment body 12 defines a seat 16 for housing a lower portion 17 of a bottle 6, and the seat 16 is open at the top. The seat 16 is delimited by a bottom 18 and by a lateral wall 19, which develops upwards from the bottom 18. The upper area of the lateral wall 19 defines an upper opening 20 of the seat 16. In the seat 16, a vertical axis can be identified which coincides with the abovementioned central axis 21 and which, advantageously, corresponds to the vertical axis about which the rotation of the support plate 1 occurs relative to the rotating carrousel 3, if envisaged. Furthermore, in use, the central axis 21 advantageously coincides with the axis of the bottle 6.

Perpendicular to the central axis 21, the seat 16 can have any cross section that allows both the housing of a lower portion 17 of the bottle 6 and locking during use according to the methods described below. It is further envisaged that, in use, the lower portion 17 of the bottle 6 can be inserted in the seat 16 through the upper opening 20 and along the line of insertion which corresponds to the central axis 21.

The support plate 1 also comprises at least one locking body 22 which is made with an elastically deformable material and which is mounted at the lateral wall 19 of the seat 16. The description below will mainly refer to a single locking body 22, but it should be understood that the description of one locking body 22 can also apply to a plurality of locking bodies 22 if there is more than one locking body 22 present in the support plate 1.

Due to the elasticity of the material it is made from, the locking body 22 can be elastically deformed. In particular, when is mounted in its position at the lateral wall 19 and is not subject to other stresses (forces exerted on it by elements external to the support plate 1), the locking body 22 adopts a home configuration and does not interfere with the insertion of the bottle 6 in the seat 16. Depending on the embodiments, the home configuration of the locking body 22 can correspond to an undeformed configuration or to a partially deformed configuration (for example, if the locking body 22 is partially squashed into a housing intended to house it).

Advantageously, a support plate 1 made according to the present invention is configured to be used only with some types/sizes of bottle 6; in particular, the types and sizes of bottles 6 with which the support plate 1 can be used are dictated by the shape, sizes and deformability characteristics of the locking body 22.

Figure 10:
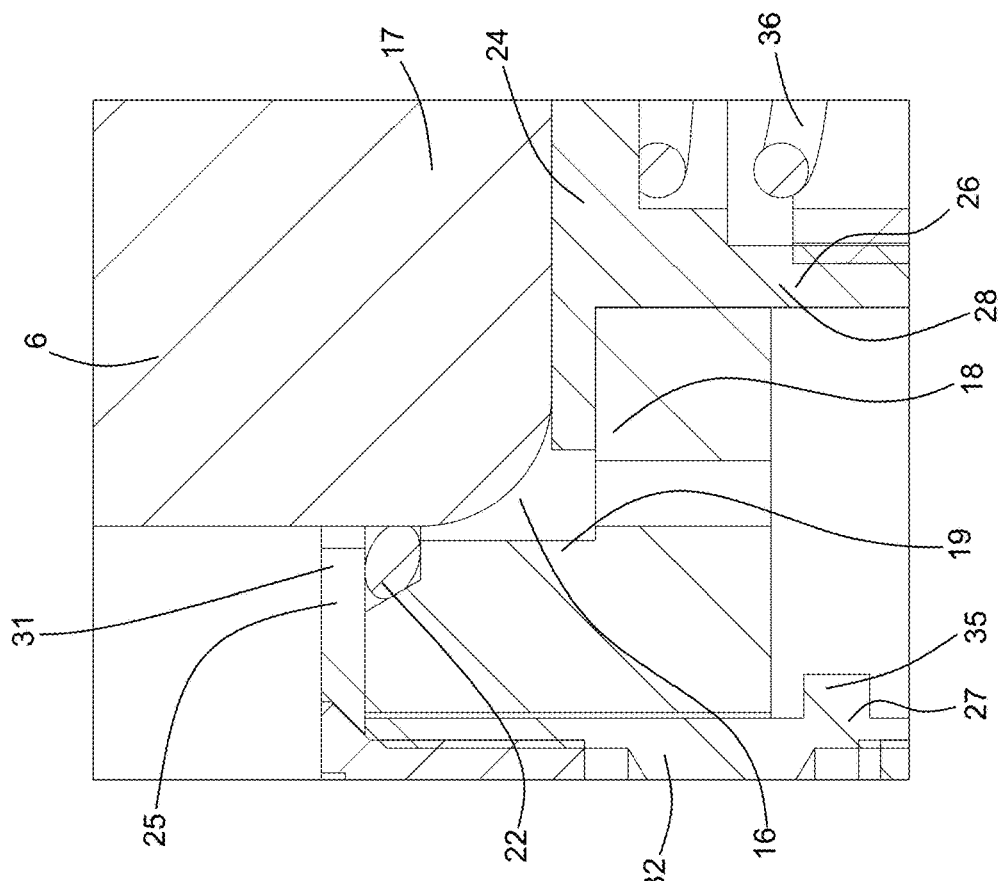
FIG. 10 shows the enlargement of a detail shown in FIG. 8A.
Figure 9:
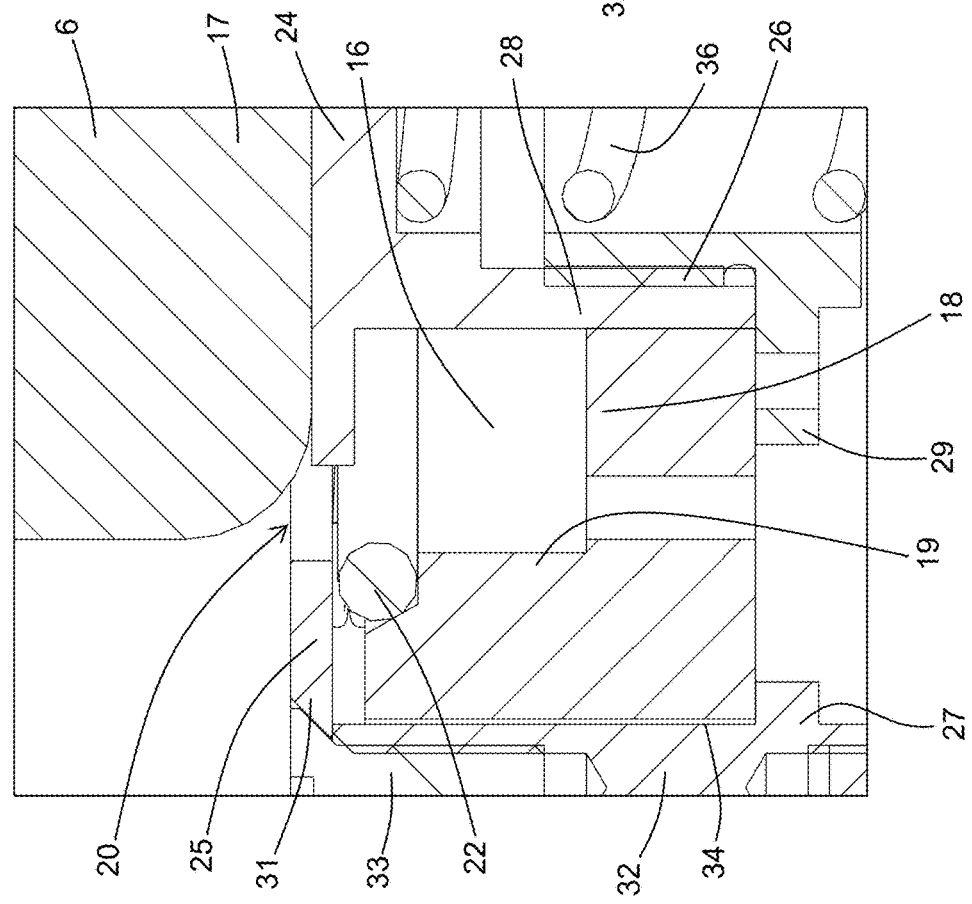
FIG. 9 shows the enlargement of a detail shown in FIG. 5A.

Indeed, according to the present invention, and starting in the home configuration (FIG. 9), the locking body 22 can be elastically deformed to adopt a deformed configuration in which it projects towards the central axis 21 of the seat 16 to a greater extent than when it is in the home configuration, thus reducing, where situated, the space available for the bottle 6 (FIG. 10). This is for the purpose of adhering, in use, the deformed locking body 22 to a lateral surface of the bottle 6 and thus obstructing a movement of the bottle 6 relative to the containment body 12; preferably, once it has been deformed, when finding itself in use in the deformed configuration, the locking body 22 is also partly squashed against the lateral surface of the bottle 6.

In the preferred embodiment shown in the accompanying drawings, the locking body 22 is constituted of a ring which extends along the entire lateral wall 19 of the seat 16, about the central axis 21; advantageously, in the home configuration, the inside of such ring is slightly wider than the bottle 6 which it is intended to retain (moreover, the shape of the ring advantageously corresponds to the shape of the cross-section of the portion of the bottle 6 to which the locking body 22 must couple in the deformed configuration), whereas the inside is narrower than the bottle 6 when in the deformed configuration (with the bottle 6 absent).

In some embodiments, the locking body 22 can comprise a plurality of rings placed at various vertical points along the lateral wall 19.

In other embodiments, the support plate 1 can, on the other hand, comprise a plurality of locking bodies 22 distributed about the central axis 21. In that case, the locking bodies 22 can be of a shape other than a ring and each extend only a limited distance about the central axis 21.

To cause the switching of the locking body 22 from the home configuration to the deformed configuration, the support plate 1 also comprises a deforming unit 23 mounted on the containment body 12.

The deforming unit 23 is operatively associated with the locking body 22, and is movable, relative to the containment body 12 and the locking body 22, between an inactive position and an active position. When in the inactive position, the deforming unit 23 allows the at least one locking body 22 to adopt and keep the home configuration. By contrast, when in the active position, the deforming unit 23 mechanically acts on locking body 22 and keeps it in the deformed configuration (in particular by squashing it)

The passage of the deforming unit 23 from the inactive position to the active position causes the passage of the at least one locking body 22 from the home configuration to the deformed configuration, while the passage of the deforming unit 23 from the active position to the inactive position releases the locking body 22 and allows it to return to the home configuration due to the elastic behaviour of its constituent material.

According to another innovative aspect of the present invention, the deforming unit 23 comprises an activating portion 24 which is positioned at least partly inside the seat 16 and which is configured to interact in use with a base surface of the bottle 6. The activating portion 24 is movable, relative to a containment body 12, between a home position (FIGS. 5A and 5B) and an operating position (FIGS. 8A and 8B), which differs due to the size of the projection of the activating portion 24 inside the seat 16. Indeed, when the activating portion 24 is in the home position, the activating portion 24 projects inside the seat 16 more than when it is in the operating position.

Furthermore, the activating portion 24 is positioned within the containment body 12 in such a way that the insertion of a bottle 6 into the seat 16 through the upper opening 20 causes the shifting of the activating portion 24 from the home position to the operating position, following the interaction between the bottle 6 and the activating portion 24.

Moreover, the deforming unit 23 is configured in such a way that the passage of the activating portion 24 from the home position to the operating position causes the passage of the deforming unit 23 from the inactive position to the active position.

In some embodiments, such as that in the accompanying drawings, the activating portion 24 is configured to interact, in use, with a bottom surface of the bottle 6 and, therefore, when the activating portion 24 is in the home position, the activating portion 24 is positioned at the upper opening 20 of the seat 16. When, on the other hand, it is in the operating position, the activating portion 24 is positioned near the bottom 18 of the seat 16, advantageously supporting the bottom 18 itself, for which it can constitute a raised part on which the bottom surface of the bottle 6 rests.

The gradual insertion of the bottle 6 into the seat 16 therefore pushes the activating portion 24 from the position at the upper opening 20 (home position) to the position at the bottom 18 of the seat 16 (operating position).

In some embodiments, the deforming unit 23 mechanically acts on the locking body 22 squashing it according to a squashing line parallel to the central axis 21 of the seat 16. In the case shown in the accompanying drawings, in which the locking body 22 is positioned at an upper edge of the lateral wall 19 of the seat 16, the deforming unit 23 comprises a rigid element 25 positioned above the locking body 22 and movable parallel to the central axis 21 to squash the locking body 22. Advantageously, the rigid element 25 has a ring shape and is centred on the central axis 21.

In some embodiments, for example that shown in the accompanying drawings, the deforming unit 23 is configured in such a way as to apply a force on the locking body 22 directly proportional to a force applied on the activating portion 24; advantageously, in use, the force on the activating portion 24 is applied by the bottle 6 (which in turn is advantageously pushed by the pusher 9 of the retaining system mounted on the rotating carrousel 3 above the support plate 1).

In some embodiments, the deforming unit 23 comprises a first member 26 and a second member 27 which are mechanically coupled.

The first member 26 is mounted in the containment body 12 and is at least partly inside the seat 16. The first member 26 defines the activating portion 24 and is therefore movable, relative to the containment body 12, between the home position and the operating position.

The second member 27 constitutes, on the other hand, the part of the deforming unit 23 which mechanically acts on the locking body 22 for keeping it in the deformed configuration, and is therefore movable between the inactive position and the active position.

In some embodiments, such as that shown in the accompanying drawings, the first member 26 is movable relative to the second member 27 during part of its shifting relative to the containment body 12.

In detail, in the shifting between the home position and the operating position, the first member 26 performs a stroke in which a first stretch, extending from the home position to an intermediate position, and a second stretch, extending from the intermediate position to the operating position, are identifiable. While the first member 26 shifts along the first stretch of the stroke (FIGS. 5A to 6B), the first member 26 is disengaged from the second member 27, which therefore remains in the inactive position. The first member 26 is engaged with the second member 27 when it reaches the intermediate position and, while the first member 26 shifts along the second stretch of the stroke (FIGS. 7A to 8B), the first member 26 remains engaged with the second member 27 and causes the shifting of the second member 27 from the inactive position to the active position.

Figure 7B:
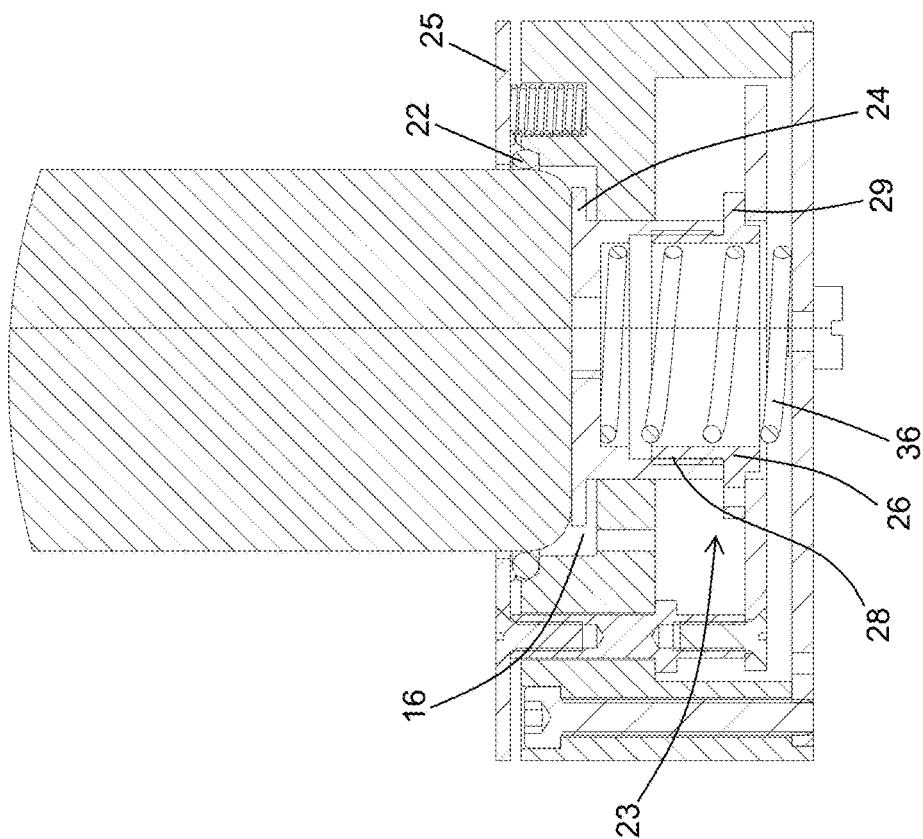
FIG. 7B shows the support plate in the configuration in FIG. 7A sectioned, however, along the B-B plane in FIG. 3.
Figure 7A:
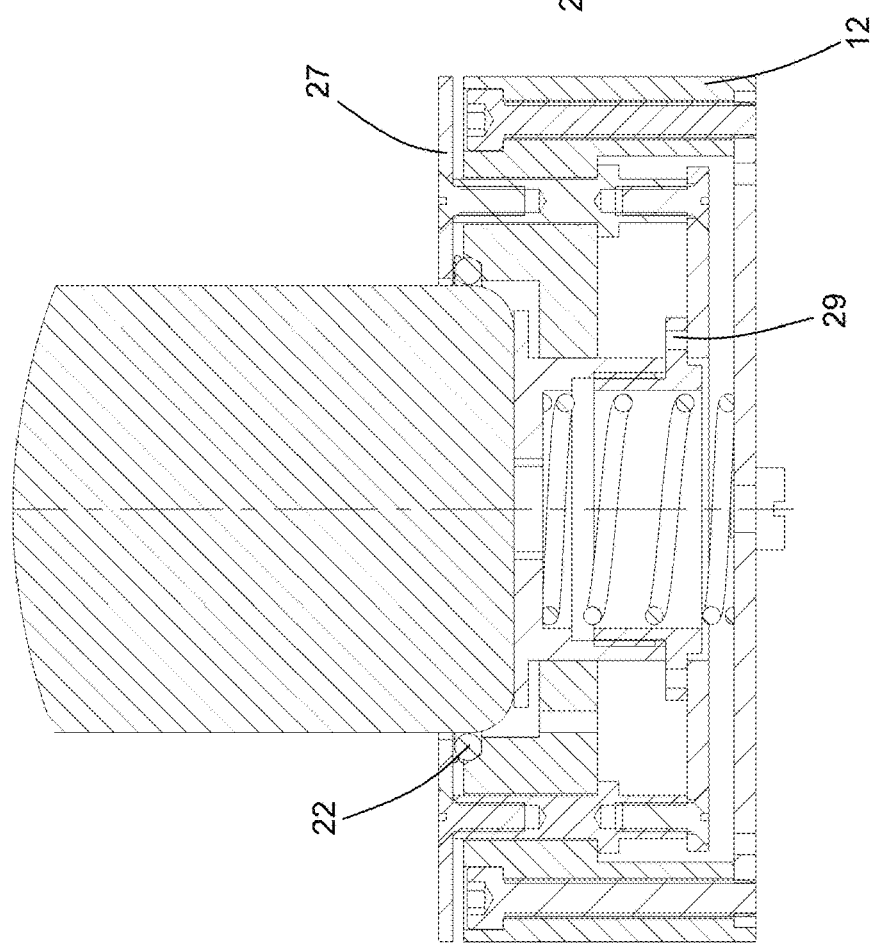
FIG. 7A shows the support plate in FIG. 5A sectioned, in a third operating step.

In some embodiments, the first member 26 also comprises, in addition to the activating portion 24, a sliding portion 28 and an engaging portion 29, with the sliding portion 28 connecting the activating portion 24 to the engaging portion 29. The sliding portion 28 is slidably coupled to the bottom 18 of the seat 16 according to a sliding axis parallel to the central axis 21, while the engaging portion 29 is positioned in the containment body 12 outside the seat 16 and is operatively associated with the second member 27. In particular, the engaging portion 29 is associated with the second member 27 in such a way as to be mechanically coupled with it when it reaches the intermediate position (FIGS. 7A-7B).

In the embodiment shown, the first member 26 is a single body in which can be identified an upper discoidal portion which constitutes the activating portion 24, a cylindrical portion centred on the central axis 21 which constitutes the sliding portion 28 and an annular flange which extends outwards perpendicular to the central axis 21 at a lower area of the cylindrical portion and which constitutes the engaging portion 29. In turn, the second member 27 comprises a lower annular plate 30 which is configured to be engaged by the annular flange, and an upper annular plate 31 which constitutes the part of the deforming unit 23 that acts mechanically on the locking body 22. The lower annular plate 30 and the upper annular plate 31 are connected by a plurality of connecting pins 32 (four in the embodiment shown) which are connected to each of them by screws 33 and which are smoothly inserted into through holes 34 made in the containment body 12. An enlargement 35 made on the connecting pins 32 defines the end stroke for the positioning of the activating portion 24 in the home position.

Advantageously, the support plate 1 also comprises elastic means interposed between the deforming unit 23 and the containment body 12 for pushing, in use, in the absence of external stresses which act on the bottle 6 inserted into the seat 16, the activating portion 24 from the operating position to the home position, such to expel the bottle 6 from the seat 16. The elastic means are further configured to elastically give way when the activating portion 24 is shifted from the home position to the operating position following the forced insertion of the bottle 6 into the seat 16.

If the deforming unit 23 is a rigid body, as the activating portion 24 is shifted from the operating position to the home position, the deforming unit 23 also switches from the active position to the inactive position.

In the embodiments in which the deforming unit 23 comprises the first member 26 and the second member 27, the elastic means comprise at least one first spring 36 which is interposed between the first member 26 and the containment body 12 for pushing the first member 26 towards the home position. In the accompanying drawings, the first spring 36 is a single helicoidal compression spring and is mounted inside of the sliding portion 28. In some cases, while the first spring 36 ensures the return of the first member 26 into the home position, the return of the second member 27 into the inactive position is caused by the sole elastic force generated by the locking body 22; as soon as the deforming unit 23 stops pushing the locking body 22, the locking unit switches from the deformed configuration to the home configuration and brings the second member 27 back into the inactive position.

In other cases, the elastic means comprise, on the on the other hand, at least one second spring 37 interposed between the second member 27 and the containment body 12 for pushing the second member 27 towards the inactive position as soon as the deforming unit 23 stops being pushed onto the locking body 22. The accompanying drawings show four second springs uniformly distributed about the central axis 21, offset relative to the connecting pins as can be seen from a comparison between each of FIGS. 5A-8A and each of FIGS. 5B-8B.

Durante operation, when the bottle 6 is loaded on the rotating carrousel 3, its bottom surface rests on the activating portion 24 which is in the home position. At that point, the pusher 9 is activated which, acting along the central axis 21, applies a downward force on the bottle 6, overcoming the resistance of the elastic means.

In greater detail, the force applied by the pusher 9 overcomes the resistance offered by the first spring 36 and moves the first member 26 of the activating unit (or, more generally, the activating portion 24) downward. When the first member 26 reaches the intermediate position, the annular flange makes contact with the second member 27. The additional push applied by the pusher 9 thus overcomes both the resistance offered by the first spring 36 and that offered by the second springs and causes the passage of the first member 26 from the intermediate position to the operating position and the subsequent passage of the second member 27 from the inactive position to the active position.

In turn, the movement of the second member 27 causes the squashing of the locking body 22 and thus its switching from the home configuration to the deformed configuration, with it swelling inward toward the seat 16 and the locking body 22 subsequently adhering to the lateral surface of the bottle 6. At that point, the bottle 6 is made integral with the locking body 22 and the containment body 12 and it can then rotate integral with them about the central axis 21.

When bottle 6 is to be discharged from the rotating carrousel 3, the pusher 9 is raised causing the force pushing the bottle 6 downwards to stop.

The first spring 36 and the second spring 37 thus push, respectively, the first member 26 from the operating position to the home position and the second member 27 from the active position to the inactive position, releasing the locking body 22 which can this elastically return to the home configuration, thus decoupling from the lateral surface of the bottle 6. The return of the activating portion 24 in the home position, finally, causes the raising of the bottle 6 and its expulsion from the seat 16. The bottle 6 can thus be withdrawn from the rotating carrousel 3.

The present invention offers significant advantages.

First, thanks to the present invention, a support plate for a carrousel machine has indeed been made as an alternative to presently known devices.

In addition, it was possible to make a support plate for a carrousel machine which is mechanically simple, which can also be used with bottles without recesses in the bottom and which is less prone to issues of wear and dirt than presently known devices.

Finally, it is worth noting that the present invention is relatively easy to make and that the cost associated with its implementation is also not very high.

The invention described above may be modified and adapted in several ways without thereby departing from the scope of the inventive concept.

All details may be substituted with other technically equivalent elements and the materials used, as well as the shapes and dimensions of the various components, may vary according to requirements.

The invention claimed is:

1. A support plate for a carrousel machine (2) comprising:
 a containment body (12) which is mountable on a rotating carrousel (3) of the carrousel machine (2), the containment body (12) defining a seat (16) for housing a lower portion (17) of a bottle (6), the seat (16) having a bottom (18), a lateral wall (19), an upper opening (20) and a central axis (21), in use a lower portion (17) of the bottle (6) being able to be inserted into the seat (16) through the upper opening (20) and along said central axis (21);
 at least one locking body (22) which is made with an elastically deformable material and which is positioned at the lateral wall (19) of the seat (16); and
 a deforming unit (23) mounted in the containment body (12) and operatively associated with the at least one locking body (22), the deforming unit (23) being movable, relative to the containment body (12), between an inactive position in which it allows the at least one locking body (22) to adopt a home configuration, and an active position, in which it mechanically acts on the at least one locking body (22) and keeps it in a deformed configuration, the passage of the deforming unit (23) from the inactive position to the active position causing the passage of the at least one locking body (22) from the home configuration to the deformed configuration;
and wherein:
 when the at least one locking body (22) is in the deformed configuration, the at least one locking body (22) is elastically deformed relative to when it is in the home configuration in such a way that it projects towards the central axis (21) of the seat (16) more than when it is in the home configuration, for, in use, adhering to a lateral surface of the bottle (6) and obstructing a movement of the bottle (6) relative to the containment body (12);

a deforming unit (23) comprises an activating portion (24) positioned at least partly inside the seat (16), configured to interact in use with a base surface of the bottle (6), and movable relative to the containment body (12) between a home position and an operating position;

when the activating portion (24) is in the home position, the activating portion (24) projects inside the seat (16) more than when it is in the operating position;

the activating portion (24) is positioned in such a way that the insertion of a bottle (6) into the seat (16) through the upper opening (20) causes the shifting of the activating portion (24) from the home position to the operating position; and the passage of the activating portion (24) from the home position to the operating position causes the passage of the deforming unit (23) from the inactive position to the active position.

2. The support plate according to claim 1 wherein the at least one locking body (22) is constituted of a ring which extends along the entire lateral wall (19) of the seat (16), or wherein the support plate (1) comprises a plurality of said locking bodies (22) distributed around the central axis (21).

3. The support plate according to claim 1, wherein the activating portion (24) is configured to interact, in use, with a lower surface of the bottle (6), wherein, when the activating portion (24) is in the home position, the activating portion (24) is positioned at the upper opening (20) of the seat (16), and wherein, when the activating portion (24) is in the operating position, the activating portion (24) is positioned near the bottom (18) of the seat (16).

4. The support plate according to claim 1, further comprising elastic means interposed between the deforming unit (23) and the containment body (12) for pushing, in use, in the absence of external stresses which act on the bottle (6) inserted into the seat (16), the activating portion (24) from the operating position to the home position, for expelling the bottle (6) from the seat (16), the elastic means elastically yielding when the activating portion (24) is shifted from the home position towards the operating position.

5. The support plate according to claim 1, wherein the at least one locking body (22) is positioned at an upper edge of the lateral wall (19) of the seat (16).

6. The support plate according to claim 1, wherein the deforming unit (23) comprises a rigid element (25) positioned above the locking body (22) and movable parallel to the central axis (21).

7. The support plate according to claim 1, wherein the deforming unit (23) comprises a first member (26) and a second member (27) which are mechanically coupled, the first member (26) being mounted in the containment body (12) and at least partly inside the seat (16), defining the activating portion (24) and being movable relative to the containment body (12) between the home position and the operating position, and the second member (27) being movable between the active position and the inactive position and mechanically acting on the at least one locking body (22) for keeping it in the deformed configuration.

8. The support plate according to claim 7, wherein the first member (26) is movable relative to the second member (27) and wherein, in the shifting between the home position and the operating position, the first member (26) performs a stroke in which a first stretch extending from the home position to an intermediate position and a second stretch extending from the intermediate position to the operating position are identified, wherein, while the first member (26) shifts along the first stretch of the stroke, the first member (26) is disengaged from the second member (27), and wherein, while the first member (26) shifts along the second stretch of the stroke, the first member (26) is engaged with the second member (27) and causes the shifting of the second member (27) from the inactive position to the active position.

9. The support plate according to claim 1, wherein the first member (26) further comprises a sliding portion (28) slidably coupled to the bottom (18) of the seat (16) according to a sliding axis parallel to the central axis (21) and an engaging portion (29) positioned in the containment body (12) outside the seat (16), wherein the sliding portion (28) connects the activating portion (24) to the engaging portion (29) and wherein the engaging portion (29) is operatively associated with the second member (27).

10. The support plate according to claim 7, further comprising elastic means interposed between the deforming unit (23) and the containment body (12) for pushing, in use, in the absence of external stresses which act on the bottle (6) inserted into the seat (16), the activating portion (24) from the operating position to the home position, for expelling the bottle (6) from the seat (16), the elastic means elastically yielding when the activating portion (24) is shifted from the home position towards the operating position, and wherein the elastic means comprise at least one first spring (36) interposed between the first member (26) and the containment body (12) for pushing the first member (26) towards the home position.

11. The support plate according to claim 7, further comprising elastic means interposed between the deforming unit (23) and the containment body (12) for pushing, in use, in the absence of external stresses which act on the bottle (6) inserted into the seat (16), the activating portion (24) from the operating position to the home position, for expelling the bottle (6) from the seat (16), the elastic means elastically yielding when the activating portion (24) is shifted from the home position towards the operating position, and wherein the elastic means comprise at least one second spring (37) interposed between the second member (27) and the containment body (12) for pushing the second member (27) towards the inactive position.

12. The support plate according to claim 1, wherein the deforming unit (23) mechanically acts on the locking body (22) squashing it according to a squashing line parallel to the central axis (21) of the seat (16).

13. The support plate according to claim 1, wherein the deforming unit (23) is configured in such a way as to apply a force on the locking body (22) directly proportional to a force applied by the bottle (6) on the activating portion (24).

14. A carrousel machine for performing one or more processing operations on bottles (6), comprising a rotating carrousel (3) which rotates around a main axis of rotation (4), wherein a plurality of operating stations (8) are distributed around the main axis of rotation (4) along a perimetric zone of the rotating carrousel (3), and wherein each operating station (8) comprises a support plate (1) at the bottom according to claim 1 and a pusher (9) at the top, the support plate (1) being positioned with the central axis (21) of the seat (16) parallel to the axis of rotation and the pusher (9) being operatively active along the central axis (21) for pressing the bottle (6) into the seat (16).

15. The carrousel machine according to claim 14 wherein the at least one locking body (22) is constituted of a ring which extends along the entire lateral wall (19) of the seat (16), or wherein the support plate (1) comprises a plurality of said locking bodies (22) distributed around the central axis (21).

16. The carrousel machine according to claim 14 wherein the activating portion (24) is configured to interact, in use, with a lower surface of the bottle (6), wherein, when the activating portion (24) is in the home position, the activating portion (24) is positioned at the upper opening (20) of the seat (16), and wherein, when the activating portion (24) is in the operating position, the activating portion (24) is positioned near the bottom (18) of the seat (16).

17. The carrousel machine according to claim 14, also comprising elastic means interposed between the deforming unit (23) and the containment body (12) for pushing, in use, in the absence of external stresses which act on the bottle (6) inserted into the seat (16), the activating portion (24) from the operating position to the home position, for expelling the bottle (6) from the seat (16), the elastic means elastically yielding when the activating portion (24) is shifted from the home position towards the operating position.

18. The carrousel machine according to claim 14 wherein the at least one locking body (22) is positioned at an upper edge of the lateral wall (19) of the seat (16).

19. The carrousel machine according to claim 14 wherein the deforming unit (23) comprises a rigid element (25) positioned above the locking body (22) and movable parallel to the central axis (21).

20. The carrousel machine according to claim 14, wherein the deforming unit (23) comprises a first member (26) and a second member (27) which are mechanically coupled, the first member (26) being mounted in the containment body (12) and at least partly inside the seat (16), defining the activating portion (24) and being movable relative to the containment body (12) between the home position and the operating position, and the second member (27) being movable between the active position and the inactive position and mechanically acting on the at least one locking body (22) for keeping it in the deformed configuration.

\* \* \* \* \*